United States Patent
Guimard et al.

(10) Patent No.: US 7,014,274 B2
(45) Date of Patent: Mar. 21, 2006

(54) SHEET-STEEL WHEEL RIM WITH OPTIMIZED PROFILE

(75) Inventors: Bruno Guimard, Chamalieres (FR); Denis Alff, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 165 days.

(21) Appl. No.: 10/624,990

(22) Filed: Jul. 22, 2003

(65) Prior Publication Data

US 2004/0124695 A1 Jul. 1, 2004

Related U.S. Application Data

(63) Continuation of application No. PCT/EP02/00545, filed on Jan. 21, 2002.

(30) Foreign Application Priority Data

Jan. 23, 2001 (FR) .................................. 01 00968

(51) Int. Cl.
*B60B 21/00* (2006.01)
(52) U.S. Cl. .............................. 301/95.101; 301/95.108
(58) Field of Classification Search ........... 301/63.101, 301/95.101, 95.107, 95.108; 29/894.323, 29/894.325, 894.35, 894.353, 894.354
See application file for complete search history.

(56) References Cited

U.S. PATENT DOCUMENTS

| 2,083,326 | A | * | 6/1937 | Eksergian | 301/5.1 |
| 2,200,361 | A | * | 5/1940 | Hunt | 301/95.108 |
| 3,627,382 | A | * | 12/1971 | Lejeune | 301/63.108 |
| 4,088,372 | A | * | 5/1978 | Jewett et al. | 301/64.302 |
| 4,127,022 | A | * | 11/1978 | Bosch | 72/370.11 |
| 4,962,587 | A | * | 10/1990 | Ashley et al. | 29/894.35 |
| 5,579,578 | A |   | 12/1996 | Ashley, Jr. | 29/894.322 |
| 6,450,226 | B1 | * | 9/2002 | DeLacroix et al. | 152/427 |

FOREIGN PATENT DOCUMENTS

| DE | 19721860 | 11/1997 |
| EP | 0780244 | 6/1997 |

* cited by examiner

*Primary Examiner*—Russell D. Stormer
(74) *Attorney, Agent, or Firm*—Buchanan Ingersoll PC

(57) ABSTRACT

A motor vehicle sheet-steel wheel rim (30, 50), including axially, from the inner side to the outer side, an inner hook (4), an inner seat (5), a connecting zone (7), a mounting groove (9), a hump (11), an outer seat (5) and an outer hook (13), the rim being intended to be joined to a wheel disc (2) under the mounting groove (9), wherein with the rim having a given thickness E in mm at the mounting groove (9), the connecting zone (7) includes a zone (Z5, Z'4) of thickness E1 in mm such that:

$E/3 + 0.5$ mm $\geq E1 \geq E/3$ mm; and $E1 \geq 0.7$ mm.

17 Claims, 4 Drawing Sheets

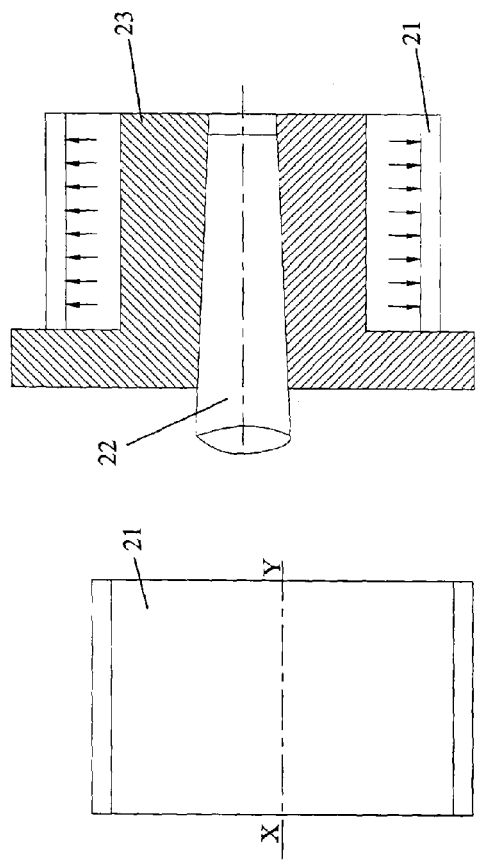
Fig. 3
Fig. 4
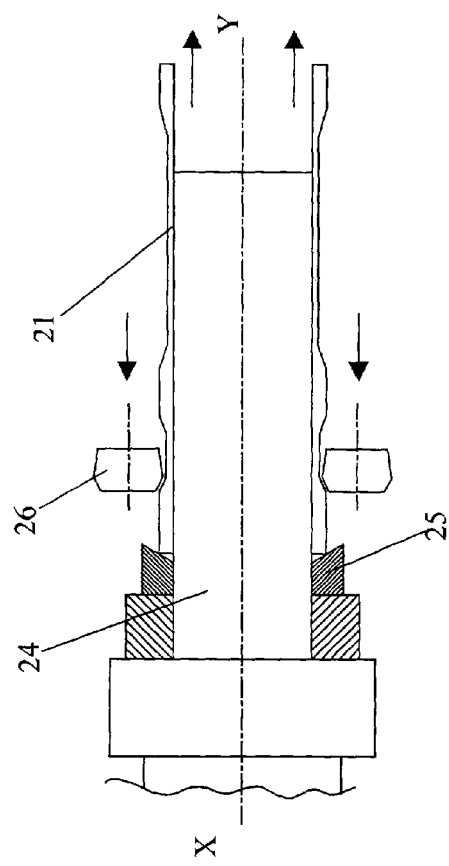
Fig. 5

SHEET-STEEL WHEEL RIM WITH OPTIMIZED PROFILE

CROSS REFERENCE TO RELATED APPLICATIONS

The present application is a continuation of international application PCT/EP02/00545 filed Jan. 21, 2002, which was published in French on Aug. 1, 2002 as publication number WO 02/058946 and which claims priority to French application number 01/00968 filed Jan. 23, 2001.

BACKGROUND OF THE INVENTION

1. Field of the Invention

The invention relates to sheet-steel wheels including a disc and a rim with a mounting groove which are joined under the mounting groove, and relates more particularly to the profile of the section of the rims of such wheels.

2. The Related Art

The wheels of vehicles are subjected to repeated stresses in operation which may lead to degredation through fatigue. To measure the fatigue strength of the wheels, they are subjected to endurance tests on vehicles or on machines. The test machines reproduce in a simplified and accelerated manner the stresses of the wheels in actual use. The stresses of the wheels depend principally on the load of the vehicle for which the wheels are intended.

Standard sheet-steel wheel rims are produced by a series of operations for shaping a hoop of constant thickness. These rims thus have a substantially constant thickness. The zones of fatigue degradation of such wheels are usually located at the radii of the groove bottom, at the joining weld and at the valve hole (see FIG. 1).

The thickness of the original sheet-metal blanks intended for the manufacture of the rims is thus a function of the stresses to which the wheels are subjected in operation.

U.S. Pat. No. 5,579,578 (the disclosure of which is hereby incorporated by reference for all purposes) describes a method of manufacturing a wheel rim including one or more reverse cylindrical flow-turning operations in order to obtain a rim profile of variable thickness and, thereby, to reduce the weight of the rim. This patent gives no information about the profiles of the sections of the rims to be obtained.

SUMMARY OF THE INVENTION

The object of the invention is to define the section of a rim which is optimized to have a high degree of lightening while retaining an acceptable fatigue strength.

According to a first aspect, the invention relates to motor vehicle sheet-steel wheel rim, which includes axially, from the inner side to the outer side, an inner hook, an inner seat, a connecting zone, a mounting groove, a hump, an outer seat and an outer hook, such rim being intended to be joined to a wheel disc under the mounting groove. The rim is characterized in that, with the rim having a given thickness E (in mm) at the mounting groove, the connecting zone includes a zone of thickness E1 such that:

$E3+0.5$ mm $\geq E1 \geq E/3$ mm; and $E1 \geq 0.7$ mm.

The whole of the substantially cylindrical and/or frustoconical zone of the connecting zone can have a thickness E1.

These relationships show that the thickness of the rim, over all or part of the connecting zone, can be reduced by up to substantially a third of the thickness at the mounting groove. This very great thickness reduction produces a very substantial lightening of the rim, even if a rim thus optimized has a thickness at the mounting groove greater than that of a comparable single-thickness rim.

Advantageously, the thickness E2 (in mm) at the hump adjacent to the outer seat includes a zone such that:

$E2 \geq E - 0.6$ mm; and $E2 \geq 1.4$ mm.

The whole of the hump may have the thickness E2.

It is found that the thickness of the hump zone, adjacent on the outside to the mounting-groove flank through which the valve hole passes, has only a small effect on the amplitude of the stresses in the mounting-groove zone. However, the proximity of the valve-hole zone imposes a limited lack of parallelism in this zone in order to preserve good leak-tightness of the valve after it has been fitted. The minimum thickness must be of the order of 1.4 mm.

Advantageously, the wheel rim according to the invention has a thickness E3 (in mm) at the inner seat which includes a zone which satisfies the following relationships:

$E3 \geq E/3 + 0.45$ mm; and $E3 \geq 1.2$ mm.

The zone of thickness E3 may extend over the whole of the inner seat, including, where appropriate, to the hump adjacent to this seat.

These relationships show that the thickness in this zone can also be very substantially reduced, by 40 to 50% relative to the thickness in the mounting-groove zone. It is advisable, however, not to reduce this thickness below 1.2 mm, so as not to run the risk, for example, of the stresses, such as those linked to the hooks of the mounting-machine clamps for clamping the wheels, leading to damage which may be harmful in fatigue.

Preferably, $E3 \geq E/3 + 0.9$ mm. This contributes to the lightening of the rim.

Advantageously, the thickness of the wheel rim at the inner hook includes a zone, the thickness E4 (in mm) of which satisfies the following relationship:

$E4 \geq E/3 + 0.75$ mm

And preferably, $E4 \leq E/3 + 1.2$ mm

The zone of thickness E4 may include the zone of the hook with an orientation perpendicular to the axis of rotation of the wheel.

The thickness reduction in this zone may thus amount to around 40 to 27% as a function of the thickness of the mounting-groove zone. It is important to keep to the lower limits as specified so as not to impair the behavior in the fatigue tests of the mounting groove of the wheel. This is because the thickness in this zone conditions the rigidity of the rim hook.

Finally, the outer seat of the wheel may include a zone, the thickness E5 (in mm) of which satisfies the following relationship:

$E5 \geq E/3 + 0.5$ mm

Preferably, with the aim of lightening the rim, also:

$E5 \leq E/3 + 0.9$ mm

The zone of thickness E5 may extend substantially over the whole of the outer seat.

Preferably, the thickness E at the mounting groove is between 1.9 and 2.75 mm. These thicknesses are normally used for sheet-steel wheel rims of passenger cars.

BRIEF DESCRIPTION OF THE DRAWINGS

Particular embodiments of the invention are now described, by way of nonlimiting examples, with the aid of the attached drawings, in which:

FIGS. 3, 4 and 5 illustrate schematically different steps of the production process shown in FIG. 2;

DESCRIPTION OF EXEMPLARY EMBODIMENTS

Figure 1:
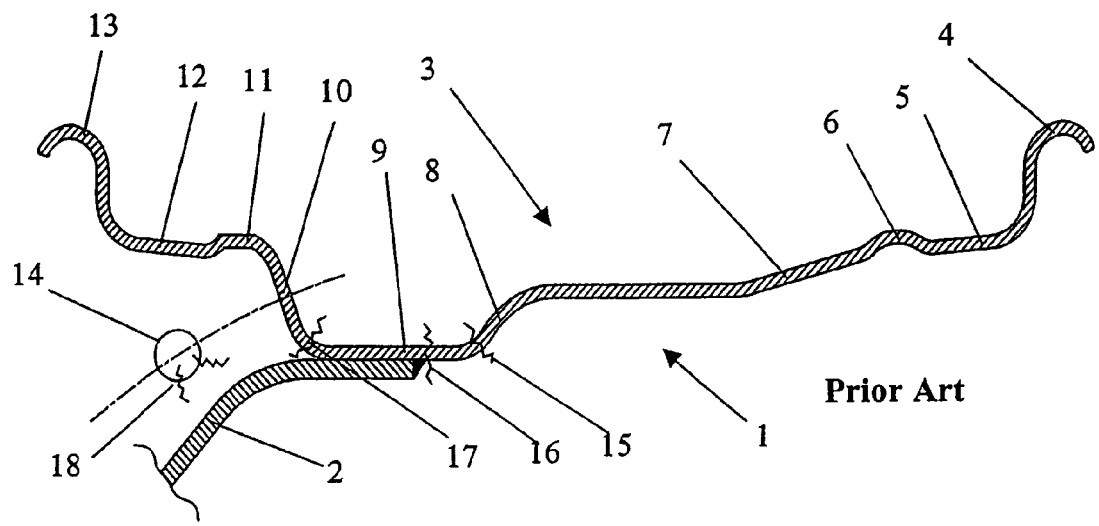
FIG. 1 is a schematic view of a conventional single-thickness wheel indicating the possible fatigue fracture zones.

FIG. 1 shows a partial section of an ordinary wheel made of sheet steel. The wheel 1 comprises a disc 2 and a rim 3.

The rim 3 is produced by a set of operations for rolling a hoop of constant thickness, and has a substantially constant thickness. The rim 3 has an inner hook 4, an inner seat 5, an inner hump 6, a transition zone 7, a mounting groove 9 with an inner flank 8 and an outer flank 10, an outer hump 11, an outer seat 12 and an outer hook 13. The disc 2 is joined to the rim 3 by fitting under the mounting groove 9. FIG. 1 also illustrates, partially folded over, the valve hole 14 which passes through the outer flank 10 of the mounting groove 9.

Hereinbelow, the same reference numbers will be used for similar parts of the embodiments of a wheel rim according to the invention.

The steps of a process for producing a wheel rim according to the invention are illustrated schematically in FIGS. 2–5. Initially, a blank of sheet metal (not shown), of steel, aluminum or alloys, is bent to give it a generally cylindrical hoop shape 21 with two free edges. Next, the hoop 21 is welded by a flash welding, resistance welding or other welding process. This hoop 21 has a constant thickness (FIG. 3). The hoop 21 is then, preferably, calibrated in expansion with the aid of a calibrating tool shown schematically in FIG. 4. The expansion is obtained by the displacement of a cam 22 which separates sectors 23 around which the hoop 21 is fitted. FIG. 5 illustrates the following step which consists in obtaining by cylindrical flow turning the flat profile which is sought for the rims according to the invention. The flow-turning process used is reverse flow turning. The hoop 21 is mounted on a mandrel 24 and comes to bear against a wall of the system 25 for locking the hoop 21. The mandrel 24 is then set in rotation and at least two rolls 26 roll on the radially outer surface of the hoop 21 in the zones in which the thickness is to be reduced. Relative to the mandrel 24, the rolls 26 are displaced axially in the direction of the X axis while applying a radial and tangential force so that the material flow flows in the direction of the arrows Y. This material flow takes place in the opposite direction to the displacement of the rolls 26. FIG. 5 illustrates schematically an example of the hoop 21 profile thus obtained. This profile comprises five zones of constant thicknesses and three transition zones of variable thicknesses.

It should be noted that this reverse flow-turning process does not permit a reduction of the thickness of the entire hoop. Indeed, a zone which is not flow-turned is left on each side of the hoop: on the side of engagement of the rolls, that could destabilize the hoop and damage the rolls; on the side of the device for fixing the hoop, forming a stop, a zone is left so that this device can grip the edge of the hoop and drive it in rotation during the flow-turning operation.

After completion of the flow-turning operations, one or both of the edges of the hoop can be cut, if necessary, and then the hoop is flared, hoop-rolling operations are performed to obtain the rim profile which is sought (see FIG. 7), the rim is calibrated and suitable discs are fitted.

In FIG. 1, the possible zones of fatigue degradation of the rim 3 of the wheel 1 are also indicated schematically. These zones are the following: the zone 15 situated in the inner flank 8 of the mounting groove 9 or at the connection between this flank 8 and the groove 9; the zone 16 situated under the mounting groove 9, close to the disc-rim weld seam; the zone 17 situated at the connection between the mounting groove 9 and the outer flank 10 of the groove; and the zones 18 at the edge of the valve hole 14. In all these zones, cracks are shown as appearing in FIG. 1.

Figure 6:
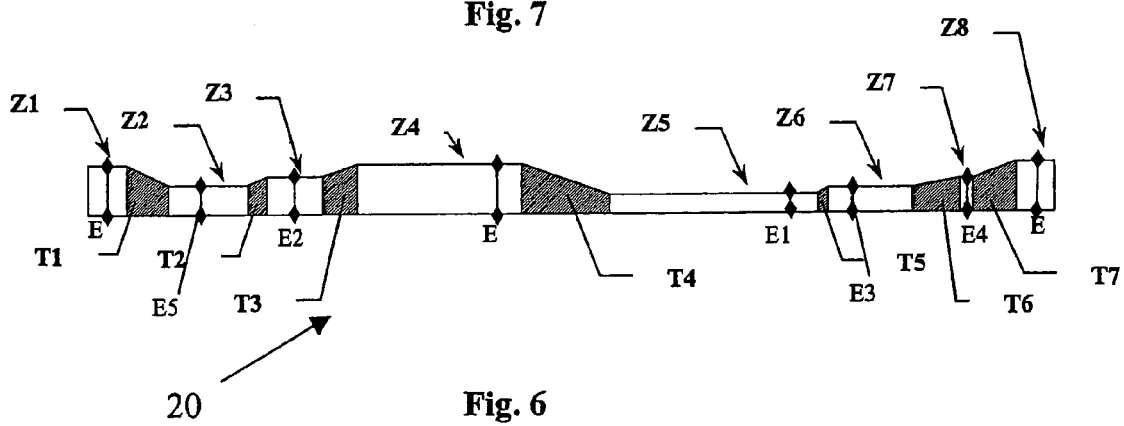
FIG. 6 is meridian sectional view of a first embodiment of a rim hoop according to the invention at the conclusion of a set of flow-turning operations.
Figure 2:
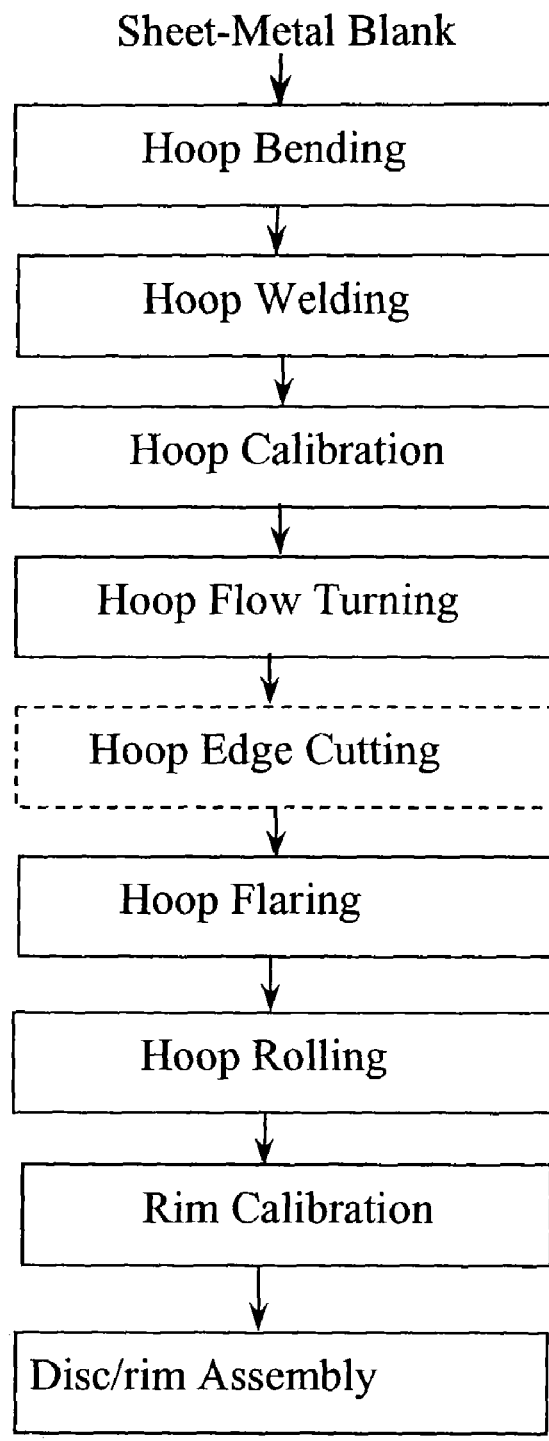
FIG. 2 shows the various steps of the process for producing a rim according to the invention.

FIG. 6 illustrates an example of a hoop obtained by a flow-turning process, corresponding to the profiles of the sections according to the invention.

This hoop 20 has 8 zones of constant thicknesses separated by 7 zones of variable thicknesses.

Figure 7:
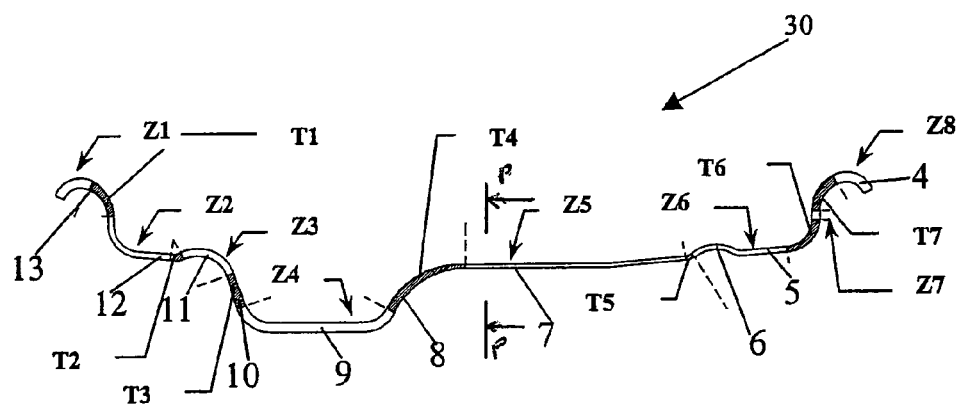
FIG. 7 is a meridian sectional view of the rim corresponding to the hoop of FIG. 6, after the roll-forming operations.

FIGS. 6 and 7 make it possible to link the various zones of constant and variable thicknesses to the geometry of the rim 30 resulting therefrom. It should be noted that, for illustrative purposes, FIG. 6 has an expanded scale in the direction perpendicular to the axial direction, relative to the scale in the axial direction.

The two zones Z1 and Z8, of constant thicknesses equal to the thickness E of the original sheet-steel blank, correspond to the two axial ends of the flanges of the hooks 13 and 4, respectively.

The zone Z2 of constant thickness E5 corresponds to the outer seat 12. Located between the zones Z1 and Z2 is the zone T1, of variable thickness, of which the thickness varies from E to E5 going from the flange of the hook to the vertical part of the hook.

Next, there is a transition zone T2 between the zones Z2 and Z3. The zone Z3 corresponds substantially to the outer hump 11. The transition zone T2 is a connection between the outer seat 12 and the hump 11. This zone has a slight radius of curvature.

The zone Z4 corresponds to the mounting groove 9 extended on both sides of the zones of the inner and outer flanks 8, 10 with slight radii of curvature. This zone Z4 has a thickness E corresponding to that of the original blank. It should be noted that this zone includes the zones of degradation 15, 16 and 17 indicated in FIG. 1. Located between Z4 and Z3 is the transition zone T3 which corresponds substantially to the outer flank 10, this zone also includes the valve hole 14 and the zones of degradation 18.

The zone Z5 corresponds to the connecting zone 7. The transition zone T4 is located between Z4 and Z5. This transition zone corresponds substantially to the inner flank 8 of the mounting groove 9. It will be appreciated that all portions of the zone Z5 lying in an imaginary plane P extending through the zone Z5 perpendicularly to the rim's axis of rotation are spaced equidistantly from the axis of rotation.

Next, there is the zone Z6 corresponding substantially to the inner seat 5 and the inner hump 6. The transition zone T5 is between Z5 and Z6.

The zone Z7 is located substantially in the vertical part (or perpendicular to the axis of rotation of the rim) of the inner hook 4. This zone is adjacent, on the inside, to T6 and, on the outside, to T7. T6 corresponds to the axially inner end of the inner seat 5 as far as the vertical part of the hook 4. T7 corresponds to the first part of the flange of the inner hook 4. Finally, there is the zone Z8 of constant thickness corresponding to the inner edge of the flange of the hook 4.

The following table shows the relative thicknesses of the various zones Z1 to Z8 in the example of FIGS. 6 and 7, taking as reference at 100 the initial thickness E of the original blank, as well as the recommended ranges of values, taking as reference the thicknesses of the original blank of between 1.9 and 2.75 mm.

| | Zone | | | | | | | |
|---|---|---|---|---|---|---|---|---|
| | Z1 | Z2 | Z3 | Z4 | Z5 | Z6 | Z7 | Z8 |
| Relative thickness | 100 | 64 | 80 | 100 | 50 | 73 | 82 | 100 |
| Min.–max. range | | 50–80 | 70–100 | | 33–60 | 48–80 | 60–97 | |

This table shows that the wheel rims of variable thickness according to the invention have a main zone of thickness and weight reduction, the zone Z5 corresponding to the connecting zone 7. The thickness reduction may amount to 66% relative to the thickness of the original metal blank.

The second zone is Z6, here the thickness reduction may amount to 50%. It is, however, necessary to retain a thickness greater than 1.2 mm in order to avoid the possibility of, for example, stresses such as those associated with the hooks of the mounting-machine clamps for clamping the wheels leading to damage which may be harmful in fatigue.

In the case of a wheel of dimensions 6.5 J 15 H2, for a given specification, an ordinary rim has a thickness of the order of 2.0 mm, whereas the thickness E for a rim according to the invention may be 2.2 mm. For such wheels, the saving of weight obtained for a rim according to the invention may amount to 0.7 kg, i.e., on the order of 15 to 20%.

It should be noted that the thickness reduction and consequently the saving of weight, may, in many cases, be relatively high when the thickness of the original blank increases and also when the diameter of the wheel increases.

Figure 8:
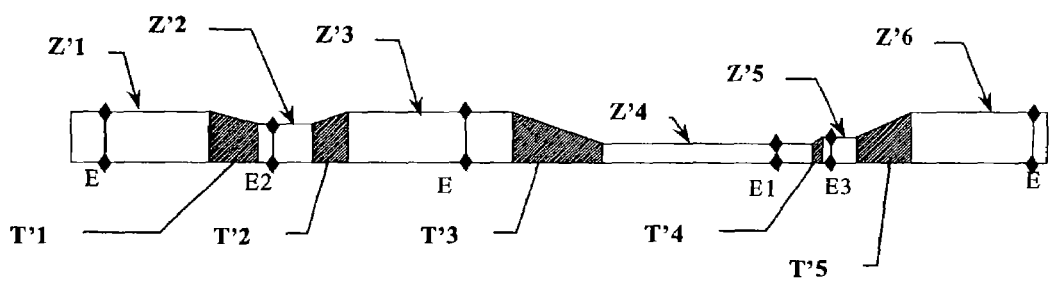
FIG. 8 is a meridian sectional view of a second embodiment of a rim hoop according to the invention at the conclusion of a set of flow-turning operations.

FIG. 8 illustrates a second example of a hoop obtained by a flow-turning process, corresponding to the profiles of the sections according to the invention.

This hoop 40 has 6 zones of constant thicknesses separated by 5 zones of variable thicknesses.

Figure 9:
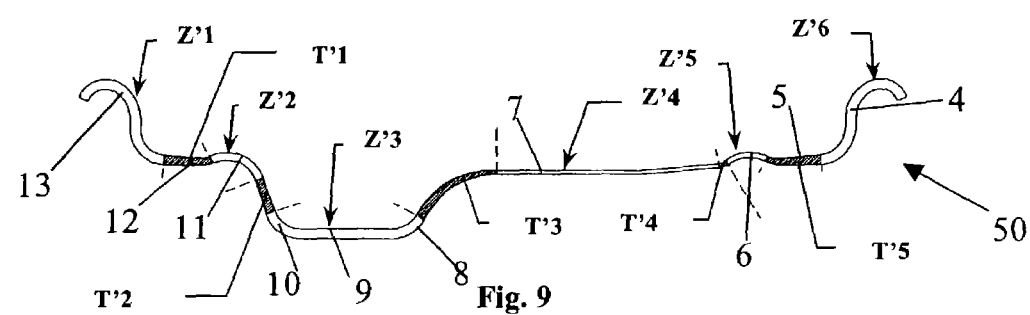
FIG. 9 is a meridian sectional view of the rim corresponding to the hoop of FIG. 8, after the roll-forming operations have shaped it.

As before, FIGS. 8 and 9 make it possible to link the various zones of constant and variable thicknesses to the geometry of the rim 50 resulting therefrom.

The two zones Z'1 and Z'6 correspond to the two axial ends of the hoop, these two zones have the thickness E of the original sheet-metal blank. They correspond here to the whole of the inner hook 4 and the outer hook 13 as far as the ends of the inner seat 5 and the outer seat 12.

The zone Z'2 of constant thickness E2 corresponds substantially to the outer hump 11. Located between the zones Z'1 and Z'2 is the transition zone T'1 which corresponds to the outer 12.

The zones Z'3 and Z'4 correspond respectively to the mounting groove 9 extended by the zones, with a slight radius of curvature, of the flanks 10 and 8 of the groove 9 and to the connecting zone 7. The thickness of the zone Z'3 is E, and that of the zone Z'4 is E1.

Located between Z'2 and Z'3 is the transition zone T'2 which corresponds substantially to the valve-hole zone of the flank 10. Located between Z'3 and Z'4 is the transition zone T'3, which corresponds substantially to the zone with a slight radius of curvature comprising the axially outer end of the connecting zone 7 and the axially inner end of the inner flank 8 of the mounting groove 9.

The zone Z'5 corresponds substantially to the inner hump 6. Its thickness is E3. Located between Z'4 and Z'5 is the transition zone T'4, of short length.

Finally, located between the zone Z'6 and the zone Z'5 is the transition zone T'5 which corresponds substantially to the inner seat 5.

The example of FIGS. 8 and 9 is a simplified example of the rim profile according to the invention, in which, in fact, the profile between the axially outer end of the inner seat 5 and the axially inner end of the outer seat 12 is identical to that of the rim 30. The simplification stems from the constant-thickness profile of the two, inner and outer, hooks, which stiffens them. Consequently, the thickness of the original blank of this rim can be compared with that of a standard rim of constant thickness. This profile thus makes it possible to obtain a substantially identical lightening of the weight of the rim.

The examples of FIGS. 6 to 9 are to be considered merely as nonlimiting examples of the scope of the invention. Indeed, it is possible to facilitate notably the production of the flat profile of the hoop by flow turning by defining a profile with fewer zones of different thicknesses, 4 or 5 for example.

What is claimed is:

1. A motor vehicle sheet-steel wheel rim having an axis of rotation and including axially, from the inner side to the outer side, an inner hook, an inner seat, a connecting zone, a mounting groove, a hump, an outer seat and an outer hook, said rim being intended to be joined to a wheel disc under the mounting groove, wherein, with said rim having a given thickness E in mm at said mounting groove, the connecting zone includes a zone of thickness E1 in mm such that:

$E/3 + -0.5 \text{ mm} \geq E1 \geq E/3 \text{ mm}$; and $E1 \geq 0.7 \text{ mm}$ wherein all portions of the zone of thickness E1 lying in an imaginary plane extending through the zone of thickness E1 perpendicularly to an axis of rotation of the rim are spaced equidistantly from the axis of rotation.

2. A wheel rim according to claim 1, in which the whole of the connection zone has said thickness E1.

3. A wheel rim according to claim 1, in which the outer hump includes a zone of thickness E1 in mm which satisfies the following relationships:

$E \geq E-0.6$ mm; and $E2 \geq 1.4$ mm.

4. A wheel rim according to claim 3, in which the zone of thickness E1 extends substantially over the whole of the outer hump.

5. A wheel rim according to claim 1, in which the inner seat includes a zone of thickness E3 in m which satisfies the following relationships:

$E \geq E/3+0.45$ mm; and $E3 \geq 1.2$ mm.

6. A wheel rim according to claim 5, in which:

$E \geq E/3+0.9$ mm.

7. A wheel rim according to claim 5, in which the whole of the inner seat has said thickness E3.

8. A wheel rim according to claim 7, in which, with the rim including an axially inner hump, the zone of thickness E3 comprises the whole of said axially inner hump.

9. A wheel rim according to claim 5, in which the inner hook includes a zone of thickness E4 in mm which satisfies the following relationship:

$E4 \geq E/3+0.75$ mm.

10. A wheel rim according to claim 9, in which:

$E4 \leq E.3+1.2$ mm.

11. A wheel rim according to claim 8, in which the zone of the hook of thickness E4 includes a zone of the hook with an orientation perpendicular to the axis of rotation of the wheel.

12. A wheel rim according to claim 5, in which the outer seat includes a zone of thickness E5 in mm such that:

$E5 \geq E/3\_+0.5$mm.

13. A wheel rim according to claim 12, in which the thickness E5 is such that:

$E5 \leq E/3+0.9$ mm.

14. A wheel rim according to claim 12, in which the zone of the outer seat of thickness E5 extends substantially over the whole of the outer seat.

15. A wheel rim according to claim 14, in which the zone of thickness E5 extends as far as the zone of the outer hook with an orientation perpendicular to the axis of rotation of the wheel.

16. A wheel rim according to claim 1, in which the thickness E at the mounting groove is between 1.9 and 2.75 mm.

17. A wheel rim according to claim 1, in which the variations in thickness are obtained by flow-turning operations.

\* \* \* \* \*